United States Patent
Sathya et al.

(10) Patent No.: US 10,728,100 B2
(45) Date of Patent: Jul. 28, 2020

(54) DETERMINING MESH NETWORKS BASED ON DETERMINED CONTEXTS

(71) Applicant: Facebook, Inc., Menlo Park, CA (US)

(72) Inventors: Sai Sri Sathya, Tamil Nadu (IN); Ramesh Raskar, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 231 days.

(21) Appl. No.: 15/862,327

(22) Filed: Jan. 4, 2018

(65) Prior Publication Data
US 2019/0207819 A1   Jul. 4, 2019

(51) Int. Cl.
*H04L 12/24* (2006.01)
*H04W 88/08* (2009.01)
*H04W 84/18* (2009.01)
*H04W 24/08* (2009.01)
*H04W 48/16* (2009.01)

(52) U.S. Cl.
CPC ............ *H04L 41/12* (2013.01); *H04L 41/142* (2013.01); *H04W 24/08* (2013.01); *H04W 84/18* (2013.01); *H04W 88/08* (2013.01); *H04W 48/16* (2013.01)

(58) Field of Classification Search
None
See application file for complete search history.

(56) References Cited

U.S. PATENT DOCUMENTS

| 2014/0162688 | A1* | 6/2014 | Edge | H04W 8/005 |
| | | | | 455/456.1 |
| 2014/0258260 | A1* | 9/2014 | Rayborn | G06F 16/951 |
| | | | | 707/707 |

* cited by examiner

*Primary Examiner* — Chi H Pham
*Assistant Examiner* — Raul Rivas
(74) *Attorney, Agent, or Firm* — Baker Botts L.L.P.

(57) ABSTRACT

In one embodiment, a method includes receiving a first location of a first client system of a first user and a second location of a second client system of a second user; determining that the first location and the second location are within a threshold proximity; accessing information associated with the first user and the second user to determine a first-user-specific context associated with the first user and a second-user-specific context associated with the second user; determining, based on the first location and the second location and further based on the first-user-specific context and the second-user-specific context, a potential mesh network for connecting the first client system to the second client system; and initiating an agent that is configured to send a communication prompt to the first client system for initiating a communication between the first client system and the second client system.

20 Claims, 9 Drawing Sheets

DETERMINING MESH NETWORKS BASED ON DETERMINED CONTEXTS

TECHNICAL FIELD

This disclosure generally relates to the determination of potential mesh networks for connecting client systems.

BACKGROUND

A mesh network may refer to a network (typically employing local network topology) that connects a group of client systems, so that data can be exchanged among the client systems. Mesh networks may be wired or wireless.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Although it is becoming easier for user systems such as mobile phones and laptops to go online and connect to other users anywhere in the world, there are still many cases where an offline or partially offline mesh network is advantageous. For example, there are still areas that do not have access to an online infrastructure (e.g., areas without cellular phone service or cable access). Even in areas where there is typically access, in periods of high network traffic (e.g., during a music festival, a sports game, or other event that draws large crowds), such access could be limited or interrupted. In such cases, mesh networks may be effective in connecting client systems of users to, for example, enable users to communicate among themselves, receive notifications, or share content. However, in areas with large concentrations of users, creating and operating a mesh network that connects every user in the area may introduce technical challenges, not to mention challenges in user experience. For example, an offline (or partially-online) mesh-network-based group chat with thousands of users may prove to be unwieldy both for the client systems of the users (which may be overloaded with having to negotiate and exchange information with a large number of client systems) and for the users themselves (who may be overloaded with information streaming in from the thousands of users). The disclosed invention hopes to solve these challenges by identifying smaller, more tailored mesh networks that may connect only users who are most likely willing to talk to each other. In particular embodiments, these tailored mesh networks may be intelligently identified based on user-specific and location-specific contexts. By identifying smaller mesh networks, resources (e.g., of the involved client systems) may be conserved. Additionally, users may be less inundated with communications or other information from users they may not be interested in. Identifying mesh networks in a tailored fashion may also have the advantage of helping users discover other users with similar interests, or to engage in more useful or relevant conversations than an indiscriminate mesh network that connects all nearby users. For example, when a Star Trek fan enters a coffee shop, the user may be able to quickly identify and connect with other Star Trek fans who may be discussing a particular Star Trek episode.

In particular embodiments, a computing system (e.g., server computing machine) may receive a first location of a first client system of a first user and a second location of a second client system of a second user. The computing system may determine that the first location and the second location are within a threshold proximity. The computing system may access information associated with the first user and the second user to determine a first-user-specific context associated with the first user and a second-user-specific context associated with the second user. The computing system may determine, based on the first location and the second location and further based on the first-user-specific context and the second-user-specific context, a potential mesh network for connecting the first client system to the second client system. The computing system may initiate an agent that is configured to send a communication prompt to the first client system for initiating a communication between the first client system and the second client system. In particular embodiments, any or all of the steps described herein may be performed by one or more client systems of a potential mesh network (e.g., the first client system and/or the second client system). This may be the case in either a partially-online mesh network (where a subset of client systems in the potential mesh network is online) or an offline mesh network (where all client systems in the potential mesh network are offline).

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
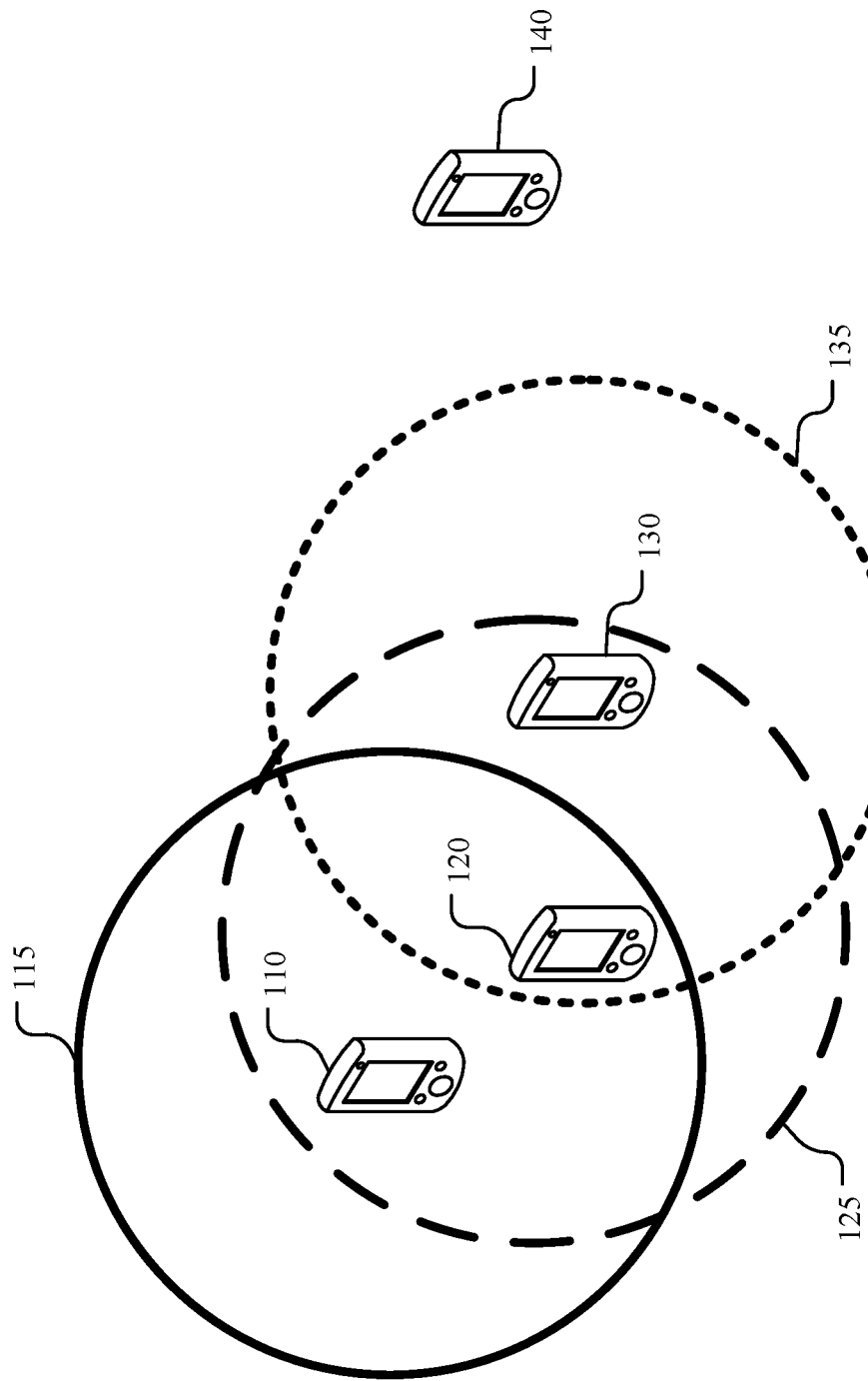
FIG. 1 illustrates an example situation with client systems within a threshold proximity.

Although it is becoming easier for user systems such as mobile phones and laptops to go online and connect to other users anywhere in the world, there are still many cases where an offline or partially offline mesh network is advantageous. For example, there are still areas that do not have access to an online infrastructure (e.g., areas without cellular phone service or cable access). Even in areas where there is typically access, in periods of high network traffic (e.g., during a music festival, a sports game, or other event that draws large crowds), such access could be limited or interrupted. In such cases, mesh networks may be effective in connecting client systems of users to, for example, enable users to communicate among themselves, receive notifications, or share content. However, in areas with large concentrations of users, creating and operating a mesh network that connects every user in the area may introduce technical challenges, not to mention challenges in user experience. For example, an offline (or partially-online) mesh-network-based group chat with thousands of users may prove to be unwieldy both for the client systems of the users (which may be overloaded with having to negotiate and exchange information with a large number of client systems) and for the users themselves (who may be overloaded with information streaming in from the thousands of users). The disclosed invention hopes to solve these challenges by identifying smaller, more tailored mesh networks that may connect only users who are most likely willing to talk to each other. In particular embodiments, these tailored mesh networks may be intelligently identified based on user-specific and location-specific contexts. By identifying smaller mesh networks, resources (e.g., of the involved client systems) may be conserved. Additionally, users may be less inundated with communications or other information from users they may not be interested in. Identifying mesh networks in a tailored fashion may also have the advantage of helping users discover other users with similar interests, or to engage in more useful or relevant conversations than an indiscriminate mesh network that connects all nearby users. For example, when a Star Trek fan enters a coffee shop, the user may be able to quickly identify and connect with other Star Trek fans who may be discussing a particular Star Trek episode.

In particular embodiments, a computing system (e.g., server computing machine) may receive a first location of a first client system of a first user and a second location of a second client system of a second user. The computing system may determine that the first location and the second location are within a threshold proximity. The computing system may access information associated with the first user and the second user to determine a first-user-specific context associated with the first user and a second-user-specific context associated with the second user. The computing system may determine, based on the first location and the second location and further based on the first-user-specific context and the second-user-specific context, a potential mesh network for connecting the first client system to the second client system. The computing system may initiate an agent that is configured to send a communication prompt to the first client system for initiating a communication between the first client system and the second client system. In particular embodiments, any or all of the steps described herein may be performed by one or more client systems of a potential mesh network (e.g., the first client system and/or the second client system). This may be the case in either a partially-online mesh network (where a subset of client systems in the potential mesh network is online) or an offline mesh network (where all client systems in the potential mesh network are offline).

In particular embodiments, a computing system may receive locations of user client systems. As an example and not by way of limitation, the computing system may receive a first location of a first client system of a first user and a second location of a second client system of a second user. A client system may include any suitable system (e.g., a mobile device, a laptop computer, an augmented-reality device, a virtual-reality device, etc.). In particular embodiments, the computing system may be a server computing machine (e.g., one that is associated with a social-networking system 760, as described further herein). In particular embodiments, the computing system may be one or more client systems, as further described herein. In particular embodiments, the locations may be expressed in any suitable format. As an example and not by way of limitation, the locations may be expressed as coordinates, or as function of a distance and direction (e.g., as a terminal point of a vector) from a reference point. In particular embodiments, the locations may be received from a Wi-Fi access point or another suitable mesh device (e.g., a mesh-network box) that may be near a client system (e.g., the first client system and/or the second client system, a third client system that is near the first client system, etc.). As an example and not by way of limitation, a Wi-Fi access point may estimate the locations of client systems based on Wi-Fi or other signals from/to the client systems. In particular embodiments, the first location and the second location may be the same or substantially same location. Although this disclosure describes the invention with examples in terms of first, second, or third user/location/client system, it contemplates any suitable number of users/locations/client systems.

In particular embodiments, the computing system may determine that two or more of the client systems are within a threshold proximity. As an example and not by way of limitation, the computing system may make this determination for the first client system and the second client system if the first location and the second location are within a threshold proximity. In this example, the threshold proximity may be defined by a fixed radius, a variable radius, or any suitable bounded region.

FIG. 1 illustrates an example situation with client systems within a threshold proximity. In particular embodiments, the parameters of the threshold proximity may be based on the locations on a number of client systems. Referencing FIG. 1 as an example and not by way of limitation, the client systems 110, 120, and 130 may be determined to be within a threshold proximity as defined by their respective bounded regions 115, 125, and 135 (with each of the bounded regions being defined, for example, by a radius originating from the respective client system). In this example, the client system 140 may be determined to not be within the threshold proximities of the other client systems. As illustrated in FIG. 1, client systems that may not have been in range of each other ordinarily may nevertheless be connected together through the mesh network by a bridging client system. As an example and not by way of limitation, referencing FIG. 1, the client systems 110 and 130 may not be within a threshold proximity, but may be connected by the client system 120, which may serve as a bridge.

In particular embodiments, the computing system may access information associated with users of the client systems to determine respective user-specific contexts. As an example and not by way of limitation, the computing system may access information associated with the first user and the second user to determine a first-user-specific context associated with the first user and a second-user-specific context associated with the second user. Information associated with the users may be accessed through any suitable method. As an example and not by way of limitation, such information may be present in the social graph 800 associated with the social-networking system 760. For example, by accessing the social graph 800, the computing system may determine that a first user has communicated frequently with a second user, that the first user has liked the page of a particular coffee shop, or that the first user has frequently submitted "check-ins" to the particular coffee shop. As another example and not by way of limitation, such information may be present in profile information of users, account information present on a third-party service, information locally stored on client systems associated with the users, or any other suitable source. In particular embodiments, the user contexts may serve to determine user interests that may be used to predict whom users want to communicate with or connect to.

In particular embodiments, the user information may include demographic information of the user. As an example and not by way of limitation, the user information may include information about the user's age, gender, hometown, languages, etc. In particular embodiments, the user information may include information about a user's affinity for particular topics (which may be associated with particular contexts). As an example and not by way of limitation, as describe herein, the affinity of a user for a particular topic (or concept) may be represented by an affinity coefficient determined based on user actions (e.g., posts, likes, reactions) related to objects associated with the topic on an online social network. For example, a user may have an affinity coefficient for the topic "coffee" that is based on the number of posts the user has made about coffee on the online social network, the number of likes or reactions (e.g., "heart" reactions) the user has submitted to media items related to coffee, the number of friends the user has who also have a high affinity coefficient for the topic "coffee," etc. In particular embodiments, the user information may include information about a first user's affinity for a second user. As an example and not by way of limitation, a first user may have an affinity coefficient for a second user that is based on a number of likes the first user has submitted for posts by the second user. In particular embodiments, the affinity coefficients of a user may be determined based on social graph information (e.g., based on the social graph 800). As an example and not by way of limitation, the number of edges that connect a node associated with a first user to a node associated with a second user or topic/concept (and any weights associated with those edges), or the degree of separation between the two nodes, may be used to determine the affinity coefficient of the first user to the respective second user or topic/concept. In particular embodiments, the information associated with a user may include information associated with other users or concepts, who may be second-, third-, or n-degree connections of the user. As an example and not by way of limitation, a first user represented by a first node in the social graph may be connected by an edge to a second node associated with a second user or a concept (e.g., corresponding to the topic "coffee") that is itself connected to a third node associated with a third user or to a place associated with a location (e.g., the coffee house "Café Nervosa"). In this example, the information associated with the first user may include information associated with the third node.

In particular embodiments, the user information may include historical common-proximity information, which may include information about a frequency or a number of occasions a first user has been within the threshold proximity with respect to a second user. The historical common-proximity information may also include information about a time duration for which the first user and the second user remained within the threshold proximity (e.g., during each occasion, a total time duration for all occasions, etc.). In particular embodiments, the user information may include historical location information, which may include information about a frequency or a number of occasions a user has been within an area defined based on a particular location (e.g., the user's current location). As an example and not by way of limitation, the historical location information of a user who is currently at a coffee shop may include the number of that the user has been to the coffee shop (e.g., the number of times a client system of the user has been within the bounds of the coffee shop). The historical location information may also include a time duration for which the user has remained within the area (e.g., during each occasion, a total time duration for all occasions, etc.). In particular embodiments, the user information may include historical communication information, which may include information about a number of occasions a user has initiated communications related to particular topics. As an example and not by way of limitation, the historical communication information of a user may include a number of times the user has sent messages, authored posts (e.g., on an online social network), reshared posts, etc., that are about the topic "coffee." The historical location information may also include a conversation length of the communications (e.g., during each occasion, a total for all occasions, etc.). As an example and not by way of limitation, the conversation length may be a measure based on a number of messages, time durations of the communications (e.g., a time duration of a phone call, video chat, text chat, etc.).

In particular embodiments, the computing system may access information associated with locations to determine location-specific contexts (e.g., contexts associated with the current locations of the client systems). As an example and not by way of limitation, the computing system may access information associated with the first location and the second location to determine a first-location-specific context associated with the first location and a second-location-specific context associated with the second location. In particular embodiments, information associated with a location may include information associated with a place (e.g., an establishment, an institution, a landmark) that is associated with the location. As an example and not by way of limitation, a client system may be at a location associated with the coffee shop Café Nervosa, which may be associated with the contexts "coffee," "tea," and "Seattle," and with users of other client systems (e.g., users who frequent the coffee shop, users who have liked the coffee shop on an online social network, etc.). In particular embodiments, information associated with a location may include information about an event associated with the location. As an example and not by way of limitation, the event may be a crisis event (e.g., a natural disaster), a music festival event, a movie, or any other event that has occurred, is occurring, or will occur at or near a location.

Figure 2:
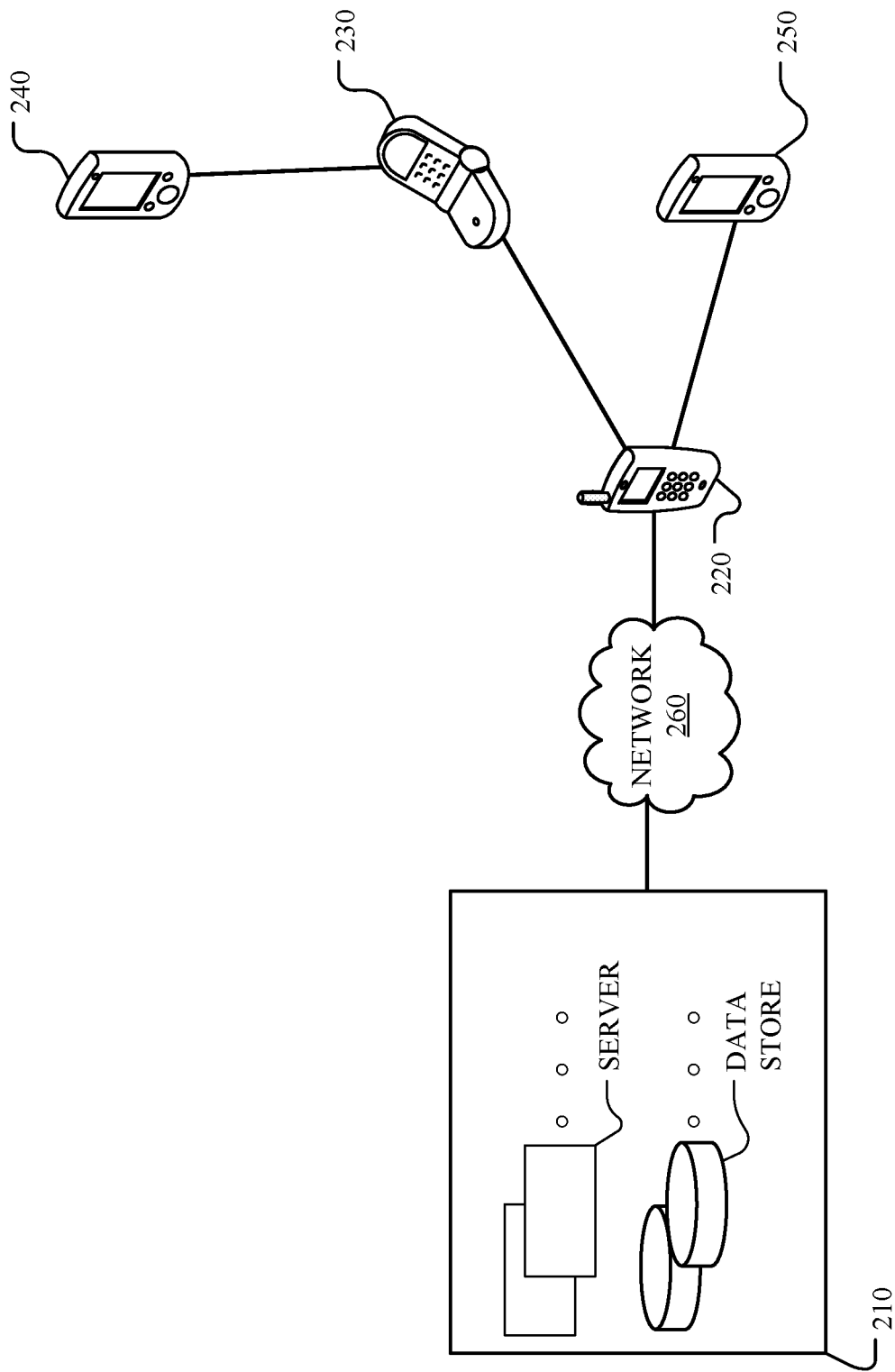
FIG. 2 illustrates an example partially-online mesh network.

In particular embodiments, the computing system may determine a potential mesh network for connecting client systems of users. In particular embodiments, the potential mesh network may be a partially-online mesh network, where a subset of client systems in the potential mesh network is online. FIG. 2 illustrates an example partially-online mesh network. In such a network, the computing system may be a server computing machine that is in communication with at least one of the client systems in the mesh network. Alternatively, the computing system may be one or more of the client systems in the mesh network. Referencing FIG. 2 as an example and not by way of limitation, the client system 220 may be online. The client system may be connected to the server computing machine 220 (e.g., the social-networking system 760) via the network 260. The client systems 230, 240, and 250 may not be online (e.g., they may not be in range of an access point for the network 260, they may not have access credentials to the access point, etc.). In this example, the server computer machine 210 may determine a mesh network that connects the client system 220 to the client systems 230, 240, and 250. In particular embodiments, the potential mesh network may be an offline mesh network, where all client systems in the potential mesh network are offline. In such a network, the computing system may be one or more of the client systems in the mesh network.

In particular embodiments, a potential mesh network connecting a group of client system may be identified based on the locations and user-specific contexts of the group of client systems. As an example and not by way of limitation, the computing system may determine a potential mesh network that is configured to connect the first client system to the second client system based on the first location and the second location and further based on the first-user-specific context and the second-user-specific context. In particular embodiments, the determination of the potential mesh network may be based on location-specific contexts. In particular embodiments, the computing system may use the determined user-specific contexts and/or location-specific contexts of a set of client systems to determine a potential mesh network that connects one or more of the client systems in the set. In particular embodiments, the computing system may determine a potential mesh network for client systems when there are one or more shared contexts among them (e.g., user-specific contexts or location-specific contexts). As an example and not by way of limitation, the computing system may determine a potential mesh network for a group of client systems if their users are interested in the book series Harry Potter and if they are at a library.

In particular embodiments, the computing system may determine a potential mesh network that connects a subset of client systems when there are sufficient shared contexts. Building on the previous example and not by way of limitation, when the computing system determines that there is a shared context, the computing system may determine a potential mesh network connecting the first client system to the second client system. Further building on this example, the computing system may in some cases only determine a mesh network connecting the first client system to the second client system when there are a threshold number of shared contexts, or when the computing system determines that the users of the client systems have a threshold level of interest in one or more of the shared contexts (e.g., based on their affinities for the shared contexts).

In particular embodiments, information associated with users and locations may be represented by vectors in a dd-dimensional vector space. User-specific contexts and location-specific contexts may be derived from the properties of the vectors associated with respective users and locations. As an example and not by way of limitation, the user-specific context of a first user may be derived from the properties of a vector representation that represents the user. In particular embodiments, the determination of a potential mesh network may include accessing the d-dimensional vector space. In these embodiments, the computing system may determine a potential mesh network that connects a first user and a second user (e.g., when their client systems are within a threshold proximity) if their vectors are determined to be sufficiently close to each other (e.g., as may be determined by a similarity metric calculation).

Figure 3:
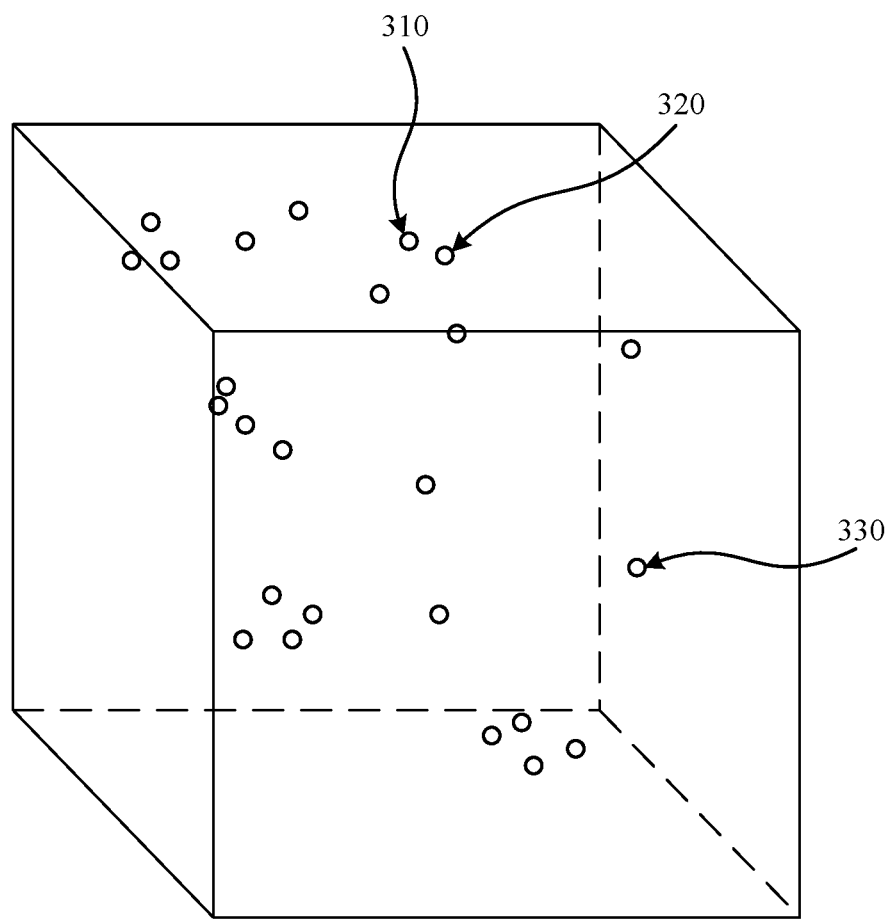
FIG. 3 illustrates an example view of a vector space.

FIG. 3 illustrates an example view of a vector space 300. In particular embodiments, an object may be represented in a d-dimensional vector space, where d denotes any suitable number of dimensions. In particular embodiments, an object may correspond to a user, place, location, context, topic, or concept, and the vector that represents these objects may represent the corresponding user, place, location, context, topic, or concept. Although the vector space 300 is illustrated as a three-dimensional space, this is for illustrative purposes only, as the vector space 300 may be of any suitable dimension. In particular embodiments, an object may be represented in the vector space 300 as a vector. Each vector may comprise coordinates corresponding to a particular point in the vector space 300 (i.e., the terminal point of the vector). As an example and not by way of limitation, referencing FIG. 3, three of the vectors in the vector space 300 may be represented by the points 310, 320, and 330. In particular embodiments, an object may be mapped to a vector representation in the vector space 300 by using a machine leaning model (e.g., a neural network). The machine learning model may have been trained using a sequence of training data.

In particular embodiments, an object may be represented in the vector space 300 as a vector referred to as a feature vector or an object embedding. As an example and not by way of limitation, objects $e_1$ and $e_2$ may be mapped to vectors $\vec{v_1}$ and $\vec{v_2}$ in the vector space 300, respectively, by applying a function $\vec{\pi}$, such that $\vec{v_1} = \vec{\pi}(e_1)$ and $\vec{v_2} = \vec{v_2}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object representing a user may be mapped to a vector by using an algorithm that takes into account the user's historical activity on a social network, the user's profile information, the users demographic information, etc. As another example and not by way of limitation, an object representing the place "Café Nervosa" may be mapped to a vector by using an algorithm that takes into account the location of Café Nervosa, events that occur at Café Nervosa, information about users who frequent Café Nervosa, etc. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e.

In particular embodiments, the social-networking system 160 may calculate a similarity metric of vectors in vector space 300. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects corresponding to the two vectors, respectively, are to one another, as measured by the distance between the two vectors in the vector space 300. As an example and not by way of limitation, vectors corresponding to points 310 and 320 may represent objects that are more similar to one another than the objects represented by vectors corresponding to the points 310 and 330, based on the distance between the respective vectors. In this example, the objects may correspond to users, in which case the similarity metric may be used to determine that the users corresponding to the points 310 and 320 may be similar enough (e.g., that they may have sufficient shared contexts) to warrant the suggestion of a mesh network connecting the two users (e.g., when they are within a threshold proximity). Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 3015, U.S. patent application Ser. No. 15/286,315, filed 5 Oct. 3016, and U.S. patent application Ser. No. 15/365,789, filed 30 Nov. 3016, each of which is incorporated by reference.

In particular embodiments, the computing system may initiate an agent that may trigger an event. As an example and not by way of limitation, the agent may be configured to send a communication prompt to the first client system for initiating a communication between the first client system and the second client system. The agent in this example may, for example, be a chat bot. In particular embodiments, the chat bot may reside on a server (e.g., in the case where the computing system is a server computing machine). In particular embodiments, the chat bot may reside on one or more of the client systems. As another example and not by way of limitation, the agent may be a crisis-communication service that, as soon as a "safety check" is initiated based on client system locations (e.g., following a natural disaster that is determined to have occurred near the client systems), users of the client system may be notified that an offline mesh network is available for communicating with nearby users. When a user accepts, the client system associated with the user may connect to an offline mesh network formed in the area. If no offline mesh network exists in the area yet, the mobile computing system may initiate forming an offline mesh network. A similar service may exist for non-crisis situations, such as concerts or other events where there is significant network traffic preventing online communications. As another example and not by way of limitation, the agent may be a notification service that sends notifications to users on a determined potential mesh network. For example, the agent may send a notification to a client system of a first user about a sale that is occurring at a location associated with a second user (e.g., a store). As another example and not by way of limitation, the agent may be a content-distribution service that allows for the delivery of content (e.g., documents, media items, etc.) to client systems of a determined potential mesh network. For example, the agent may send a request to a first client system that asks if the associated user wants to receive a photo from a nearby second client system over a mesh network.

In particular embodiments, the computing system may determine one or more contexts for the potential mesh network. It may do so by selecting one or more of the shared contexts. In doing so it may score the different shared contexts based on a predicted relative level of interest, for each shared context, of the users of the client systems in the potential mesh network. As an example and not by way of limitation, the computing system may determine that the users in a potential mesh network are interested in the movie Star Trek, but may determine that they are more interested in politics (e.g., as based on their historical communications with other users). In this example, the context "politics" may receive a higher score than the context "Star Trek." Building on the previous example and not by way of limitation, if the same group of users are at a Star Trek convention, the context "Star Trek" may receive a higher score than the context "politics."

In particular embodiments, the agent may generate a prompt or notification that is based on the one or more contexts determined for the potential mesh network. As an example and not by way of limitation, in the case of a chat bot that sends a communication prompt, the chat bot may include a suggestion of a topic of conversation that is related to one of the contexts determined for the potential mesh network. The suggestion may include one or more n-grams related to a context determined for the potential mesh network. As an example and not by way of limitation, for the context "politics," the suggestion may include the n-gram "election results". The prompt may read, for example, "Do you want to discuss the election results with other nearby users?"

In particular embodiments, the potential mesh network may be activated once agreement is reached between the first client system and the second client system. As an example and not by way of limitation, the first user and the second user may both respond affirmatively to the communication prompt by submitting a suitable input. Once the mesh network is activated, the users of the client systems in the mesh network may be able to communicate with each other.

In particular embodiments, determining and activating a potential mesh network may involve the determination and activation of an entirely new mesh network where no such mesh network existed previously. As an example and not by way of limitation, the computing system (e.g., the social-networking system 760, a local mesh device, one or more client systems, etc.) may identify five users in a coffee shop who are interested in discussing politics (e.g., based on user-specific contexts), but no mesh network may exist connecting users interested in politics. The computing system may determine a potential network for connecting the five users and activate a chat bot that sends, to each of the five users, the communication prompt "There are four other users who may be interested in discussing politics. Do you want to start a conversation?" A mesh network may be activated for users who accept, connecting their client systems so that a group chat may be formed among them. In particular embodiments, determining and activating a potential mesh network may involve the determination and activation of a mesh network that alters an existing mesh network. As an example and not by way of limitation, the computing system (e.g., the social-networking system 760, a local mesh device, one or more client systems, etc.) may determine that a first user who is a San Francisco Giants baseball fan enters a coffee shop based on signals from a client system (e.g., a mobile phone, an augmented reality device) associated with the first user. The computing system may determine that a mesh-network-based group chat consisting of four other Giants fans exists in the coffee shop. Upon determining that the first user meets the proximity and context requirements, the computing system may determine a new potential mesh network that includes the first user and the four other Giants fans. The computing system may activate a chat bot that sends, to the first user, the communication prompt "There are four other Giants fans in the coffee shop. Do you want to join the conversation?" If the first user accepts, the potential mesh network may be activated so that the first user may join the group chat.

Figure 4:
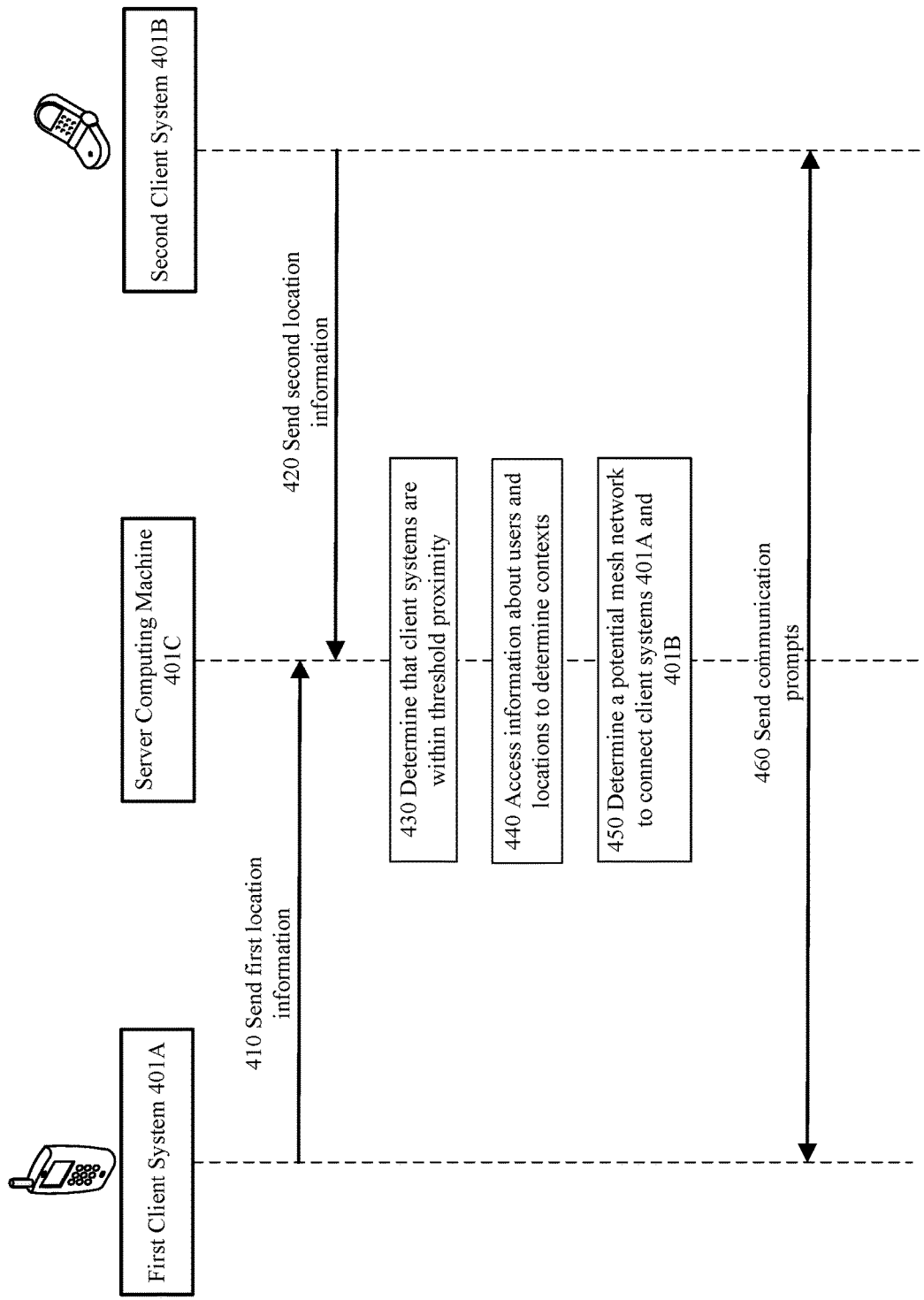
FIG. 4 illustrates an example use case for establishing a mesh-network-based communication between two client systems with a server computing machine acting as an intermediary.

FIG. 4 illustrates an example use case for establishing a mesh-network-based communication between two client systems with a server computing machine acting as an intermediary. At step 410, the first client system 401A may send first location information to the server computing machine 401C that may indicate the current location of the first client system 401A. At step 420 (which may occur before, after, or at the same time as step 410), the second client system 410B may send second location information to the server computing machine 401C. At step 430 the server computing machine may determine that the client systems 410A and 410B are within a threshold proximity. At step 440, the server computing machine may access information associated with the users of the client systems 410A and 401B and information about the first and second location to determine associated contexts. At step 450, the server computing machine may determine (e.g., based on the determined contexts) a potential mesh network to connect the client systems 401A and 401B. At step 460, the server computing machine may activate an agent that resides on the server computing machine (e.g., a chat bot associated with a messaging application that is installed on both the client systems 401A and 401B) and send communication prompts to both the client systems 401A and 401B. If both users accept, a mesh network may be activated to connect the client systems 401A and 401B, so that further communications may occur. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for establishing a mesh-network-based communication including the particular steps of the method of FIG. 4, this disclosure contemplates any suitable method for establishing a mesh-network-based communication including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
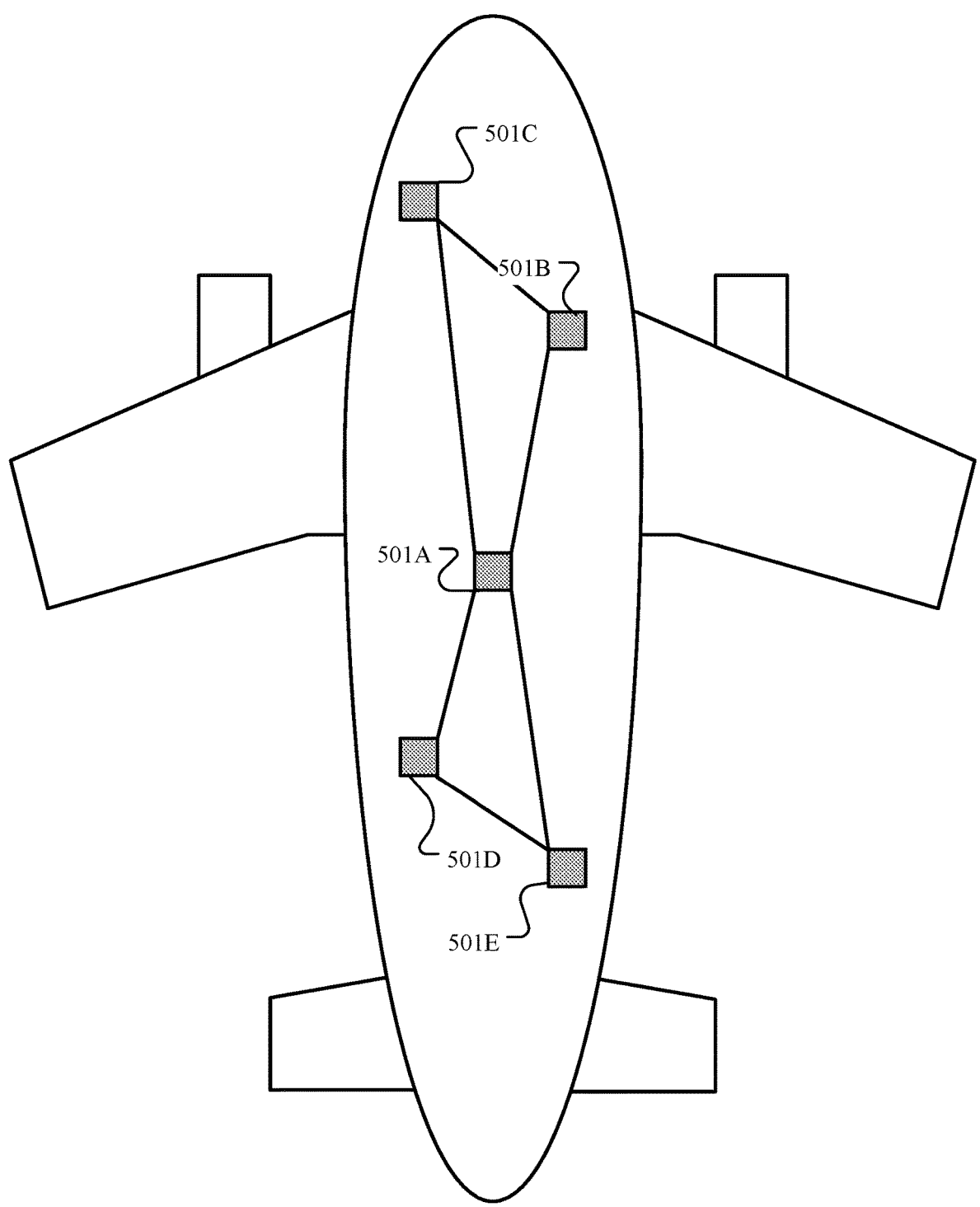
FIG. 5 illustrates an example offline mesh network.

FIG. 5 illustrates an example offline mesh network. In particular embodiments, the computing system may be one or more of the client systems in a mesh network. This may be the case in an offline mesh network or a partially-online mesh network. As an example and not by way of limitation, referencing the offline mesh network depicted in FIG. 5, the computing system may be the client system 501A. Alternatively, again referencing FIG. 5, the functions of the computing system may be performed by multiple devices (e.g., by the client systems 501A and 501B, by the client systems 501A-501E, etc.). FIG. 5 illustrates an example use case of an offline mesh network on an airplane (e.g., one that does not have access to the internet). In this example use case, the client system 501A (or any other suitable combination of client systems in range) may receive locations of other client systems (e.g., the client systems 501B, 501C, 501D, 501E) that are within a threshold proximity. The client systems may discover each other using any suitable discovery protocol and determine that they are within a threshold proximity. The client system 501A, for example, may access information associated with the users of the other client systems (e.g., which may be received directly from the other client systems, or from a server computing machine that the client system 501A is in communication with in the case of a partially-online mesh network). The client system 501A may then determine user-specific contexts (e.g., based on the information received from the other client systems) and location-specific contexts (e.g., based on information about locations that is stored locally on the client system 501A or received from other client systems such as the client systems 501B, 501C, 501D, 501E). The client system 501A may determine a potential mesh network that could connect the client systems 501A-501E and initiate an agent that triggers an event (e.g., the sending of communication prompts to the client systems 501B, 501C, 501D, 501E).

In particular embodiments, in the case of a partially-online network, some of the steps may be performed by client systems and some of the steps may be performed by a server computing machine. As an example and not by way of limitation, the threshold-proximity determinations of client systems in a potential mesh network may occur at the client side (by one or more client systems, or by a local mesh device), while the accessing of information about the users of the client systems may occur at the server side.

Figure 6:
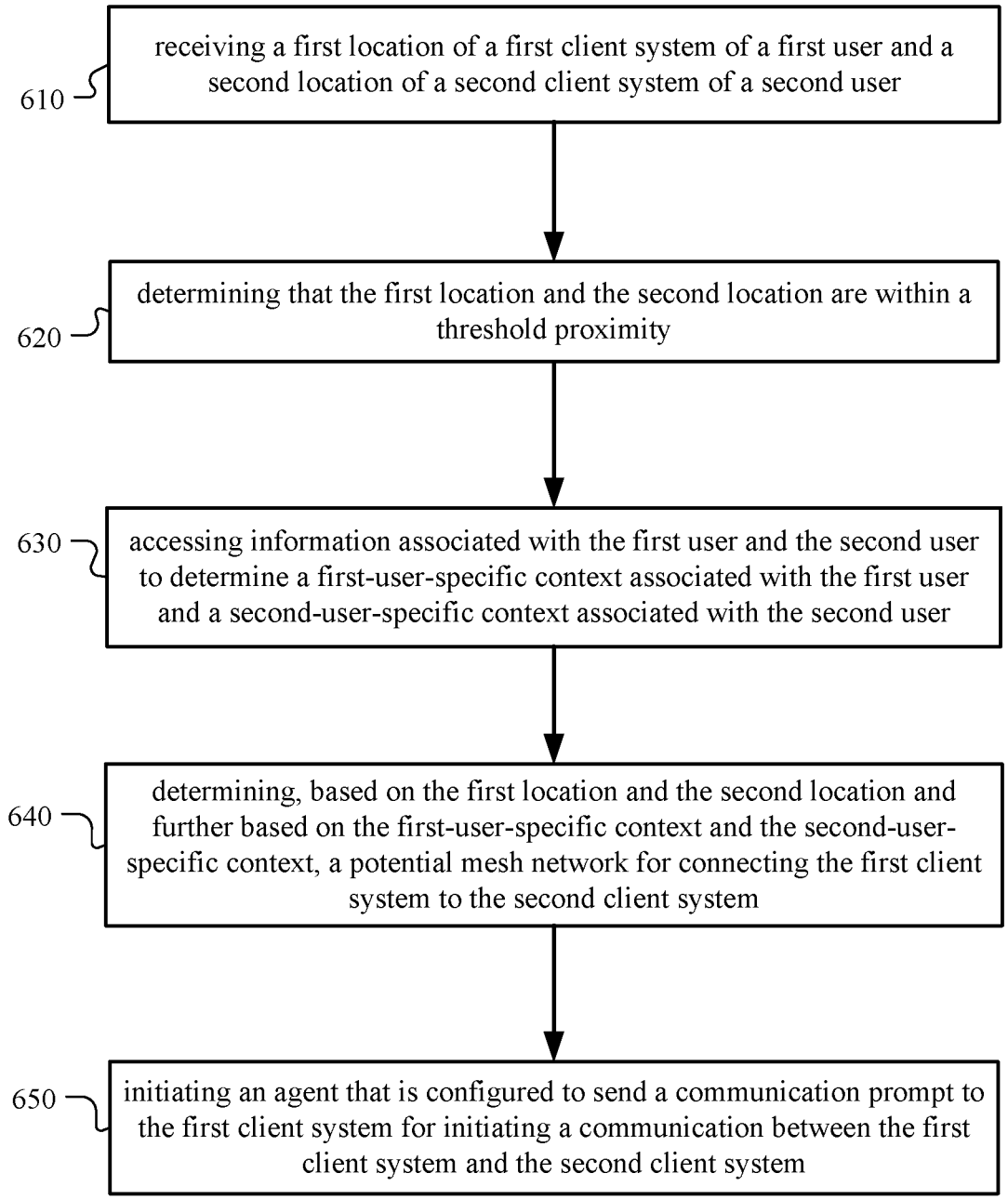
FIG. 6 illustrates an example method for illustrates an example method for determining a potential mesh network based on context.

FIG. 6 illustrates an example method 600 for determining a potential mesh network based on context. The method may begin at step 610, where a computing system (e.g., a server computing machine) may receiving a first location of a first client system of a first user and a second location of a second client system of a second user. At step 620, the computing system may determine that the first location and the second location are within a threshold proximity. At step 630, the computing system may access information associated with the first user and the second user to determine a first-user-specific context associated with the first user and a second-user-specific context associated with the second user. At step 640, the computing system may determine, based on the first location and the second location and further based on the first-user-specific context and the second-user-specific context, a potential mesh network for connecting the first client system to the second client system. At step 650, the computing system may initiate an agent that is configured to send a communication prompt to the first client system for initiating a communication between the first client system and the second client system. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining a potential mesh network based on context, including the particular steps of the method of FIG. 6, this disclosure contemplates any suitable method for determining a potential mesh network based on context, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 8:
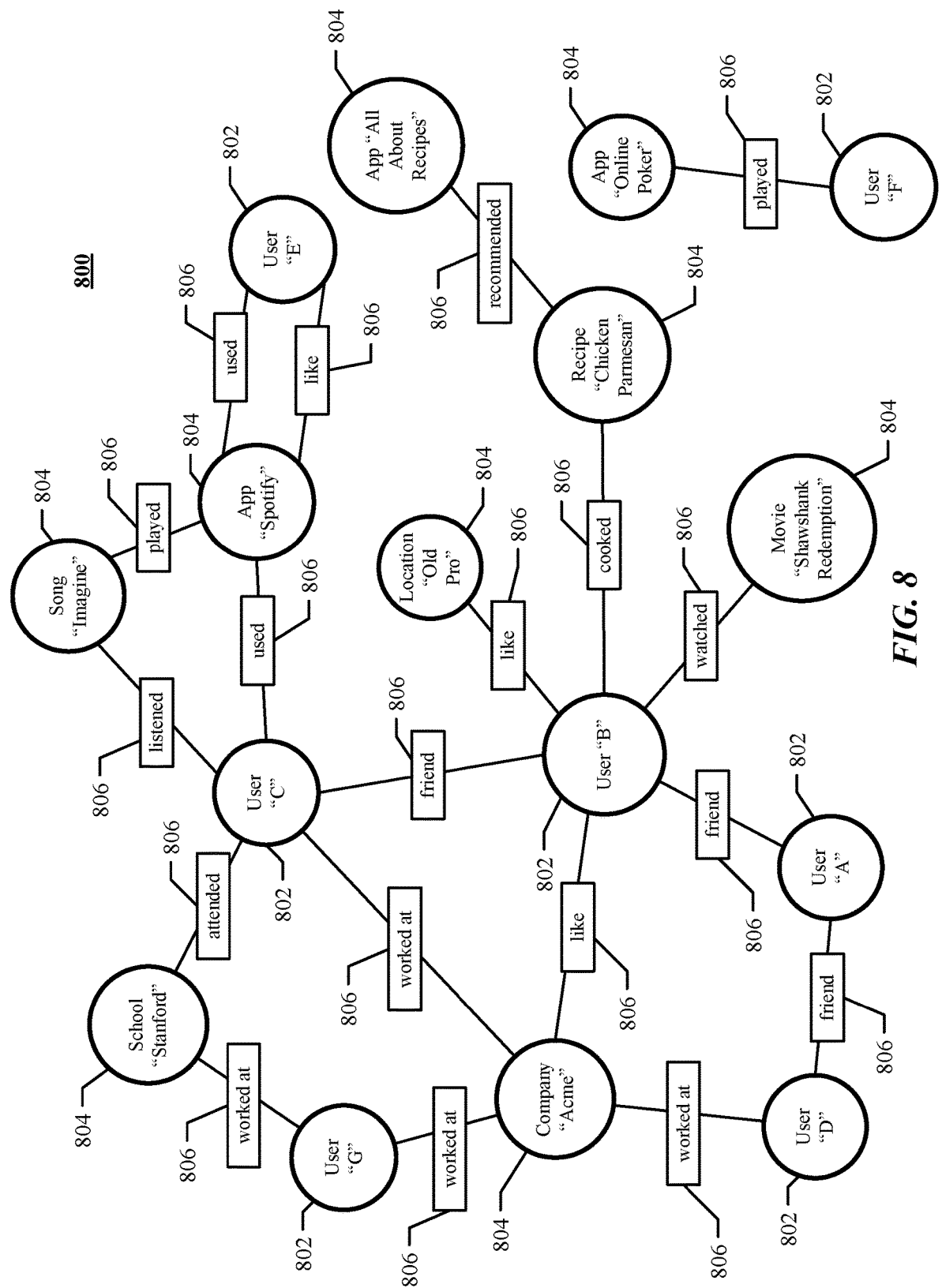
FIG. 8 illustrates an example social graph.

FIG. 8 illustrates example social graph 800. In particular embodiments, social-networking system 760 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social-networking system 760, client system 730, or third-party system 770 may access social graph 800 and related social-graph information for suitable applications. The nodes and edges of social graph 800 may be stored as data objects, for example, in a data store (such as a social-graph database). Such a data store may include one or more searchable or queryable indexes of nodes or edges of social graph 800.

In particular embodiments, a user node 802 may correspond to a user of social-networking system 760. As an example and not by way of limitation, a user may be an individual (human user), an entity (e.g., an enterprise, business, or third-party application), or a group (e.g., of individuals or entities) that interacts or communicates with or over social-networking system 760. In particular embodiments, when a user registers for an account with social-networking system 760, social-networking system 760 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 760. In particular embodiments, a user node 802 may be associated with information provided by a user or information gathered by various systems, including social-networking system 760. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 760 or a third-party website associated with a web-application server); an entity (such as, for example, a person, business, group, sports team, or celebrity); a resource (such as, for example, an audio file, video file, digital photo, text file, structured document, or application) which may be located within social-networking system 760 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 804 may be associated with information of a concept provided by a user or information gathered by various systems, including social-networking system 760. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 760. Profile pages may also be hosted on third-party websites associated with a third-party system 770. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 770. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 730 to send to social-networking system 760 a message indicating the user's action. In response to the message, social-networking system 760 may create an edge (e.g., a check-in-type edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 760 may send a "friend request" to the second user. If the second user confirms the "friend request," social-networking system 760 may create an edge 806 connecting the first user's user node 802 to the second user's user node 802 in social graph 800 and store edge 806 as social-graph information in one or more of data stores 764. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 760 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 760 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 760 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social-networking system 760 may create an edge 806 between a user node 802 and a concept node 804 in social graph 800. As an example and not by way of limitation, a user viewing a concept-profile page (such as, for example, by using a web browser or a special-purpose application hosted by the user's client system 730) may indicate that he or she likes the concept represented by the concept node 804 by clicking or selecting a "Like" icon, which may cause the user's client system 730 to send to social-networking system 760 a message indicating the user's liking of the concept associated with the concept-profile page. In response to the message, social-networking system 760 may create an edge 806 between user node 802 associated with the user and concept node 804, as illustrated by "like" edge 806 between the user and concept node 804. In particular embodiments, social-networking system 760 may store an edge 806 in one or more data stores. In particular embodiments, an edge 806 may be automatically formed by social-networking system 760 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, social-networking system 760 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 770 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 760 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 760 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 760 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 760 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 760 may calculate a coefficient based on a user's actions. Social-networking system 760 may monitor such actions on the online social network, on a third-party system 770, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 760 may calculate a coefficient based on the user's actions with particular types of content. The content may be associated with the online social network, a third-party system 770, or another suitable system. The content may include users, profile pages, posts, news stories, headlines, instant messages, chat room conversations, emails, advertisements, pictures, video, music, other suitable objects, or any combination thereof. Social-networking system 760 may analyze a user's actions to determine whether one or more of the actions indicate an affinity for subject matter, content, other users, and so forth. As an example and not by way of limitation, if a user frequently posts content related to "coffee" or variants thereof, social-networking system 760 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 760 may calculate a coefficient based on the type of relationship between particular objects. Referencing the social graph 800, social-networking system 760 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 760 may determine that the user has a higher coefficient with respect to the first photo than the second photo because having a tagged-in-type relationship with content may be assigned a higher weight and/or rating than having a like-type relationship with content. In particular embodiments, social-networking system 760 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 760 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social-networking system 760 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 730 of the user). A first user may be more interested in other users or concepts that are closer to the first user. As an example and not by way of limitation, if a user is one mile from an airport and two miles from a gas station, social-networking system 760 may determine that the user has a higher coefficient for the airport than the gas station based on the proximity of the airport to the user.

In particular embodiments, social-networking system 760 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 760 may provide information that is relevant to user's interests and current circumstances, increasing the likelihood that they will find such information of interest. In particular embodiments, social-networking system 760 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 760 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 760 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 770 (e.g., via an API or other communication channel), or from another suitable system. In response to the request, social-networking system 760 may calculate the coefficient (or access the coefficient information if it has previously been calculated and stored). In particular embodiments, social-networking system 760 may measure an affinity with respect to a particular process. Different processes (both internal and external to the online social network) may request a coefficient for a particular object or set of objects. Social-networking system 760 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 3010, U.S. patent application Ser. No. 12/978,265, filed 23 Dec. 3010, and U.S. patent application Ser. No. 13/632,869, filed 1 Oct. 3012, each of which is incorporated by reference.

Figure 7:
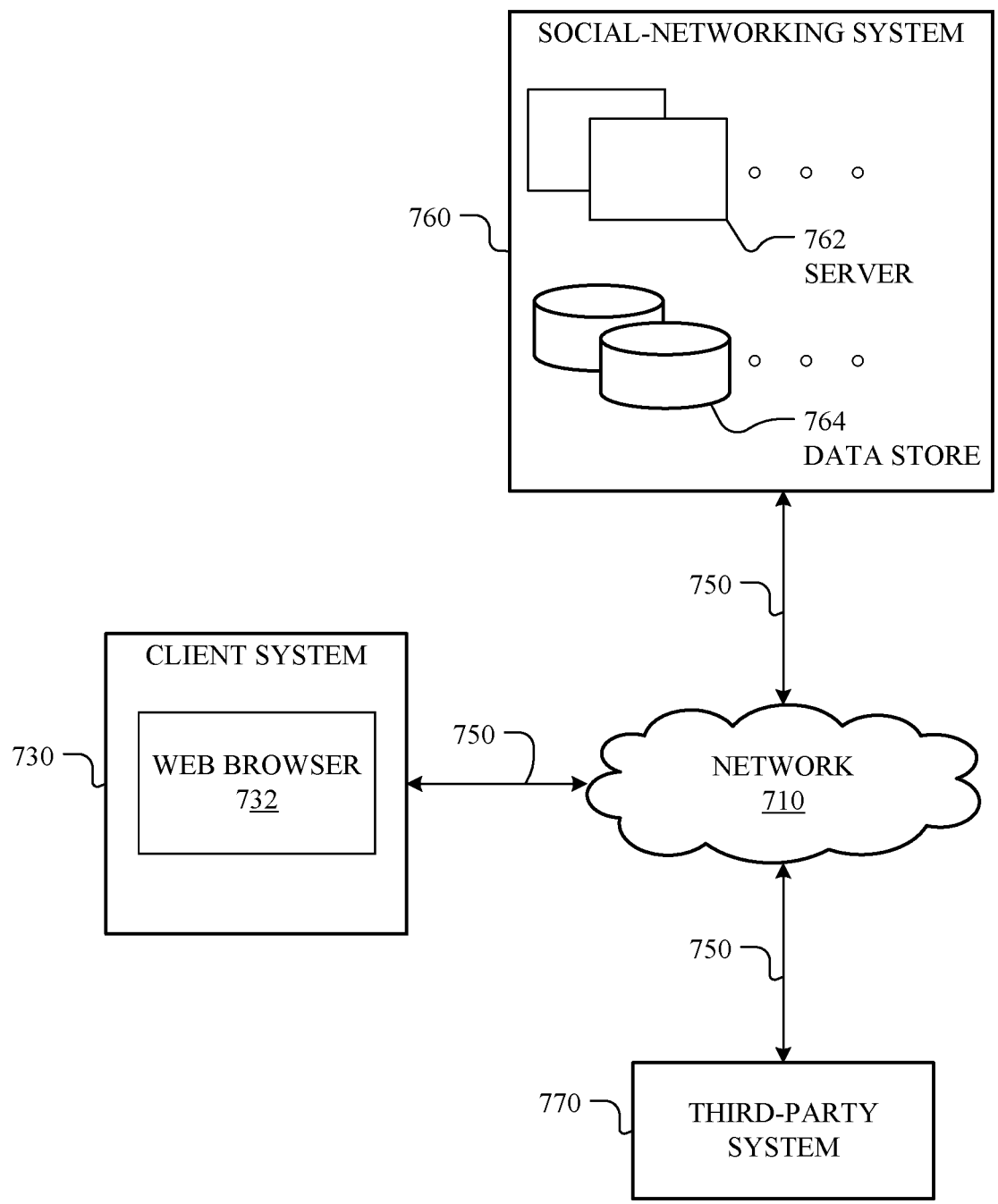
FIG. 7 illustrates an example network environment associated with a social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 may include a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 730 may enter a Uniform Resource Locator (URL) or other address directing the web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to client system 730 one or more Hyper Text Markup Language (HTML) files responsive to the HTTP request. Client system 730 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 760 may be a network-addressable computing system that can host an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. As an example and not by way of limitation, client system 730 may access social-networking system 760 using a web browser 732, or a native application associated with social-networking system 760 (e.g., a mobile social-networking application, a messaging application, another suitable application, or any combination thereof) either directly or via network 710. In particular embodiments, social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 to whom they want to be connected. Herein, the term "friend" may refer to any other user of social-networking system 760 with whom a user has formed a connection, association, or relationship via social-networking system 760.

In particular embodiments, social-networking system 760 may provide users with the ability to take actions on various types of items or objects, supported by social-networking system 760. As an example and not by way of limitation, the items and objects may include groups or social networks to which users of social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 760 or by an external system of third-party system 770, which is separate from social-networking system 760 and coupled to social-networking system 760 via a network 710.

In particular embodiments, social-networking system 760 may be capable of linking a variety of entities. As an example and not by way of limitation, social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking system 760. In particular embodiments, however, social-networking system 760 and third-party systems 770 may operate in conjunction with each other to provide social-networking services to users of social-networking system 760 or third-party systems 770. In this sense, social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 760 also includes user-generated content objects, which may enhance a user's interactions with social-networking system 760. User-generated content may include anything a user can add, upload, send, or "post" to social-networking system 760. As an example and not by way of limitation, a user communicates posts to social-networking system 760 from a client system 730. Posts may include data such as status updates or other textual data, location information, photos, videos, links, music or other similar data or media. Content may also be added to social-networking system 760 by a third-party through a "communication channel," such as a newsfeed or stream.

In particular embodiments, social-networking system 760 may include a variety of servers, sub-systems, programs, modules, logs, and data stores. In particular embodiments, social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 760 may also include suitable components such as network interfaces, security mechanisms, load balancers, failover servers, management-and-network-operations consoles, other suitable components, or any suitable combination thereof. In particular embodiments, social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 760 to one or more client systems 730 or one or more third-party system 770 via network 710. The web server may include a mail server or other messaging functionality for receiving and routing messages between social-networking system 760 and one or more client systems 730. An API-request server may allow a third-party system 770 to access information from social-networking system 760 by calling one or more APIs. An action logger may be used to receive communications from a web server about a user's actions on or off social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking system 760. A privacy setting of a user determines how particular information associated with a user can be shared. The authorization server may allow users to opt in to or opt out of having their actions logged by social-networking system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social-networking system 760 or shared with other systems (e.g., third-party system 770). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 770, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 762 may be authorization/privacy servers for enforcing privacy settings. In response to a request from a user (or other entity) for a particular object stored in a data store 764, social-networking system 760 may send a request to the data store 764 for the object. The request may identify the user associated with the request and may only be sent to the user (or a client system 730 of the user) if the authorization server determines that the user is authorized to access the object based on the privacy settings associated with the object. If the requesting user is not authorized to access the object, the authorization server may prevent the requested object from being retrieved from the data store 764, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 9:
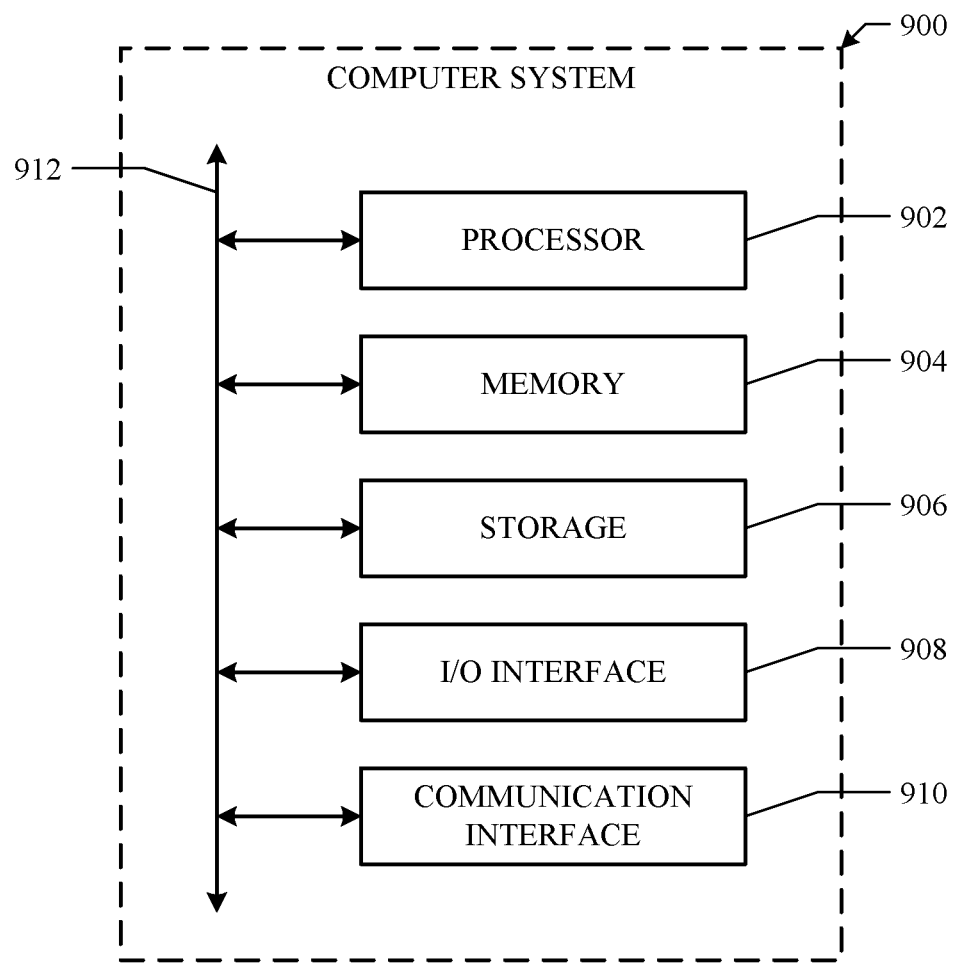
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a server computing machine, receiving a first location of a first client system of a first user and a second location of a second client system of a second user;
    by the server computing machine, determining that the first location and the second location are within a threshold proximity;
    by the server computing machine, accessing information associated with the first user and the second user to determine a first-user-specific context associated with the first user and a second-user-specific context associated with the second user;
    by the server computing machine, determining, based on the first location and the second location and further based on the first-user-specific context and the second-user-specific context, a potential mesh network for connecting the first client system to the second client system, wherein the potential mesh network connecting the first client system to the second client system is an offline mesh network; and
    by the server computing machine, initiating an agent that is configured to send a communication prompt to the first client system for initiating a communication between the first client system and the second client system.

2. The method of claim 1, wherein the first location of the first client system is received by the server computing machine from the first client system.

3. The method of claim 1, wherein the first location of the first client system is received by the server computing machine from a mesh device.

4. The method of claim 3, wherein the mesh device is a Wi-Fi access point.

5. The method of claim 1, wherein the information associated with the first user comprises profile information of the first user.

6. The method of claim 1, wherein the information associated with the first user comprises historical common-proximity information, wherein the historical common-proximity information comprises:
a number of occasions the first user has been within the threshold proximity with respect to the second user; and
for each occasion, a time duration for which the first user and the second user remained within the threshold proximity.

7. The method of claim 1, wherein the information associated with the first user comprises historical location information, wherein the historical location information comprises:
a number of occasions the first user has been within an area defined based on the first location; and
for each occasion, a time duration for which the first user remained within the area defined based on the first location.

8. The method of claim 1, wherein the information associated with the first user comprises historical communication information, wherein the historical communication information comprises:
a number of occasions the first user has initiated communications related to particular topics; and
for each occasion, a conversation length of the communication related to the respective topic.

9. The method of claim 1, wherein accessing information associated with the first user and the second user comprises:
accessing a social graph comprising a plurality of nodes and a plurality of edges connecting the nodes, each of the edges between two of the nodes representing a single degree of separation between them, the nodes comprising:
a first node corresponding to the first user;
a second node corresponding to the second user; and
a plurality of other nodes corresponding to a plurality of other users or concepts associated with the online social network, respectively.

10. The method of claim 9, wherein the first-user-specific context is based on one or more other nodes to which the first node is connected by one or more edges.

11. The method of claim 1, wherein the determination of the potential mesh network for connecting the first client system to the second client system is further based on a similarity metric of a first vector representation of the first user and a second vector representation of the second user, wherein the similarity metric is computed by:
accessing a d-dimensional space comprising the first vector representation of the first user and the second vector representation of the second user, wherein the first vector representation is generated based on the information associated with the first user and the second vector representation is generated based on the information associated with the second user; and
calculating the similarity metric based on properties of the first vector representation and the second vector representation.

12. The method of claim 1, wherein determining the potential mesh network for connecting the first client system to the second client system further comprises:
accessing information associated with the first location and the second location to determine a first-location-specific context associated with the first location and a second-location-specific context associated with the second location; and
identifying one or more shared contexts, wherein the shared contexts comprises one or more user-specific contexts or location-specific contexts that are shared by the first client system and the second client system.

13. The method of claim 12, wherein the information associated with the first location and the second location comprises information related to a shared event.

14. The method of claim 1, further comprising:
receiving a third location of a third client system, wherein the parameters of the threshold proximity are based on the first location, the second location, and the third location.

15. The method of claim 1, wherein the agent is a chat bot associated with an application that is installed on the first client system, and wherein the chat bot sends a message to the first user and the second user, wherein the message comprises a suggestion to initiate the communication.

16. The method of claim 1, wherein the agent is a chat bot that resides on the server computing machine.

17. The method of claim 1, further comprising:
identifying one or more shared contexts associated with the first-user-specific context and the second-user-specific context; and
generating the communication prompt, wherein the communication prompt comprises one or more n-grams related to one or more of the shared contexts.

18. The method of claim 1, further comprising:
detecting a third client system of a third user at a third location;
determining, based on the third location being within a threshold proximity of the first location or the second location and further based on a third-user-specific context associated with the third user, a potential mesh network for connecting the first client system, the second client system, and the third client system; and
sending information related to the third client system to the agent.

19. One or more computer-readable non-transitory storage media embodying software that is operable when executed to:
receive a first location of a first client system of a first user and a second location of a second client system of a second user;
determine that the first location and the second location are within a threshold proximity;
access information associated with the first user and the second user to determine a first-user-specific context associated with the first user and a second-user-specific context associated with the second user;
determine, based on the first location and the second location and further based on the first-user-specific context and the second-user-specific context, a potential mesh network for connecting the first client system to the second client system, wherein the potential mesh network connecting the first client system to the second client system is an offline mesh network; and initiate an agent that is configured to send a communication prompt to the first client system for initiating a communication between the first client system and the second client system.

20. A system comprising: one or more processors; and a memory coupled to the processors comprising instructions executable by the processors, the processors being operable when executing the instructions to:
receive a first location of a first client system of a first user and a second location of a second client system of a second user;
determine that the first location and the second location are within a threshold proximity;
access information associated with the first user and the second user to determine a first-user-specific context associated with the first user and a second-user-specific context associated with the second user;
determine, based on the first location and the second location and further based on the first-user-specific context and the second-user-specific context, a potential mesh network for connecting the first client system to the second client system, wherein the potential mesh network connecting the first client system to the second client system is an offline mesh network; and
initiate an agent that is configured to send a communication prompt to the first client system for initiating a communication between the first client system and the second client system.

* * * * *